2,820,793
5-NITROSIMINO-4-SUBSTITUTED-Δ²-1,3,4-THIA-DIAZOLINE-2-SULFONAMIDES

Richard William Young, Riverside, and Melinda Jane Muller, Stamford, Conn., assignors to American Cyanamid Company, New York, N. Y., a corporation of Maine No Drawing. Application August 13, 1956
Serial No. 603,841

12 Claims. (Cl. 260—306.8)

This invention relates to new organic compounds and more particularly is concerned with novel 5-nitrosimino-4-substituted-Δ²-1,3,4-thiadiazoline-2-sulfonamides which may be represented by the following general formula:

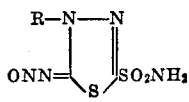

wherein R is a lower alkyl radical, a monocyclic aryl radical or a monocyclic aralkyl radical. Suitable lower alkyl substitutents are methyl, ethyl, propyl, isopropyl, butyl, pentyl, amyl, hexyl, etc.; suitable aralkyl substituents are benzyl, phenethyl, phenylpropyl, phenylbutyl, etc.; and suitable aryl substituents are phenyl and substituted phenyl, suitable substituents on the phenyl ring being —Cl, —Br, —I, —NO₂, —CH₃O, and lower alkyl radicals containing from 1 to 4 carbon atoms.

The compounds of this invention are excellent natriuretic agents, that is agents which enhance the excretion of sodium in the urine without necessarily changing the normal volume of urine excreted. The compounds may be administered orally and have been found to be effective in dosages of from 5 mg. to 100 mg. per kilogram of body weight.

The novel compounds may be prepared by a reaction which is analogous to diazotization. In carrying out the process of this invention, the salt of an appropriate imino compound is reacted with nitrous acid in a strongly acid solution. The nitrous acid usually is generated in situ by the addition of sodium nitrite to the suspension of the amine salt in excess mineral acid. The reaction is preferably carried out at temperatures of around 0° C., but the temperature may range from 0–30° C. since the final products are stable at room temperature as distinguished from the conventional diazonium salts.

As the starting materials for preparation of the products of this invention, we use appropriate 5-imino-4-substituted-Δ²-1,3,4-thiadiazoline - 2-sulfonamides, which compounds, in turn, are prepared by the acid hydrolysis of 5-acylimino-4-substituted-Δ²-1,3,4-thiadiazoline-2-sulfonamides which are more particularly described and claimed in the copending application of Young, Wood and Vaughan, Serial No. 492,297, filed March 4, 1955, now Patent No. 2,783,241, and in the copending application of Young and Muller, Serial No. 560,866, filed January 23, 1956, now Patent No. 2,783,239.

The process by which the novel compounds of this invention may be prepared is illustrated schematically below using 5 - imino-4-methyl-Δ²-1,3,4-thiadiazoline-2-sulfonamide as an example of a suitable 5-imino-4-substituted-Δ²-1,3,4-thiadiazoline-2-sulfonamide.

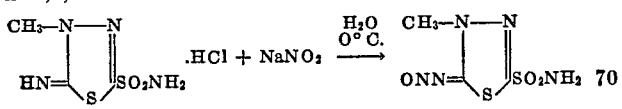

The invention will be described in greater detail in conjunction with the following specific examples in which the parts are by weight unless otherwise specified.

Example 1

To a solution at 0° C. of 23 parts 5-imino-4-methyl-Δ²-1,3,4-thiadiazoline-2-sulfonamide in 275 parts of water there is added dropwise a solution of 7.0 parts of sodium nitrite in 25 parts of water. The temperature is maintained at 0° C. during the addition and the solution is stirred for two hours. A yellow solid forms which is removed by filtration. Concentration of the solution under an air jet gives an additional quantity of solid. The total yield is 10.8 parts (48%), M. P. 148–150° dec. After several recrystallizations from 95% alcohol (Norit A), 7.9 parts (35%) of 5-nitrosimino-4-methyl-Δ²-1,3,4-thiadiazoline-2-sulfonamide, M. P. 150–153° dec., is obtained.

Example 2

The procedure of the preceding example is repeated with the sole exception that an equivalent quantity of 5-imino-4-ethyl-Δ²-1,3,4-thiadiazoline - 2 - sulfonamide is used. 5 - nitrosimino-4-ethyl-Δ²-1,3,4-thiadiazole-2-sulfonamide is produced.

Example 3

The procedure of Example 1 is followed except that an equivalent quantity of 5-imino-4-benzyl-Δ²-1,3,4-thiadiazoline-2- sulfonamide is used. 5-nitrosimino-4-benzyl-Δ²-1,3,4-thiadiazoline-2-sulfonamide is produced.

Example 4

The procedure of Example 1 is followed except that an equivalent quantity of 5-imino-4-phenyl-Δ²-1,3,4-thiadiazoline-2-sulfonamide is used. 5-nitrosimino-4-phenyl-Δ²-1,3,4-thiadiazoline-2-sulfonamide is produced.

Example 5

The procedure of Example 1 is followed except that an equivalent quantity of 5-imino-4-(m-tolyl)-Δ²-1,3,4-thiadiazoline-2-sulfonamide is used. 5-nitrosimino-4-(m-tolyl)-Δ²-1,3,4-thiadiazoline-2-sulfonamide is produced.

Example 6

The procedure of Example 1 is followed except that an equivalent quantity of 5-imino-4-(p-chlorophenyl)-Δ²-1,3,4-thiadiazoline-2-sulfonamide is used. 5-nitrosimino-4-(p-chlorophenyl)-Δ²-1,3,4-thiadiazoline-2 - sulfonamide is obtained.

Example 7

The procedure of Example 1 is followed with the exception than an equivalent quantity of 5-imino-4-(p-acetomidophenyl)-Δ²-1,3,4-thiadiazoline - 2 - sulfonamide is used. 5 - nitrosimino-4-(p-acetamidophenyl)-Δ²-1,3,4-thiadiazoline-2-sulfonamide is obtained.

Example 8

The procedure of Example 1 is followed with the exception that an equivalent quantity of 5-imino-4-(m-methoxyphenyl)-Δ²-1,3,4-thiadiazoline-2 - sulfonamide is used. 5 - nitrosimino - 4-(m-methoxyphenyl)-Δ²-1,3,4-thiadiazoline-2-sulfonamide is obtained.

We claim:

1. 5 - nitrosimino-4-substituted-Δ²-1,3,4-thiadiazoline-2-sulfonamides of the formula:

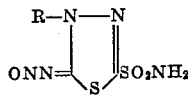

wherein R is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals.

2. 5 - nitrosimino - 4-methyl-Δ²-1,3,4-thiadiazoline-2-sulfonamide.

3. 5 - nitrosimino - 4-phenyl-Δ²-1,3,4-thiadiazoline-2-sulfonamide.

4. 5-nitrosimino - 4 - benzyl-Δ²-1,3,4-thiadiazoline-2-sulfonamide.

5. 5-nitrosimino - 4 - (m-tolyl)-Δ²-1,3,4-thiadiazoline-2-sulfonamide.

6. 5-nitrosimino - 4 - (p-chlorophenyl)-Δ²-1,3,4-thiadiazoline-2-sulfonamide.

7. The method of preparing 5-nitrosimino-4-substituted-Δ²-1,3,4-thiadiazoline-2-sulfonamides of the formula:

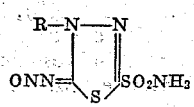

wherein R is a member selected from the group consisting of lower alkyl, phenyl, halo-substituted phenyl, nitro-substituted phenyl, amido-substituted phenyl, lower alkoxy-substituted phenyl, lower alkyl-substituted phenyl, and phenyl-lower-alkyl radicals which comprises nitrosating a 5-imino-4-substituted-Δ²-1,3,4-thiadiazoline-2-sulfonamide of the formula:

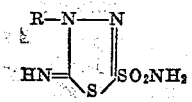

wherein R has the same meaning as above with nitrous acid.

8. The method of preparing 5-nitrosimino-4-methyl-Δ²-1,3,4-thiadiazoline-2-sulfonamide which comprises nitrosating 5-imino-4-methyl-Δ²-1,3,4-thiadiazoline-2-sulfonamide with nitrous acid.

9. The method of preparing 5-nitrosimino-4-phenyl-Δ²-1,3,4-thiadiazoline-2-sulfonamide which comprises nitrosating 5-imino-4-phenyl-Δ²-1,3,4-thiadiazoline-2-sulfonamide with nitrous acid.

10. The method of preparing 5-nitrosimino-4-benzyl-Δ²-1,3,4-thiadiazoline-2-sulfonamide which comprises nitrosating 5 - imino-4-benzyl-Δ²-1,3,4-thiadiazoline-2-sulfonamide with nitrous acid.

11. The method of preparing 5-nitrosimino-4-(m-tolyl)-Δ²-1,3,4-thiadiazoline-2 - sulfonamide which comprises nitrosating 5-imino-4-(m-tolyl)-Δ²-1,3,4-thiadiazoline-2-sulfonamide with nitrous acid.

12. The method of preparing 5-nitrosimino-4-(p-chlorophenyl)-Δ²-1,3,4-thiadiazoline - 2 - sulfonamide which comprises nitrosating 5-imino-4-(p-chlorophenyl)-Δ²-1,3,4-thiadiazoline-2-sulfonamide with nitrous acid.

No references cited.